United States Patent Office.

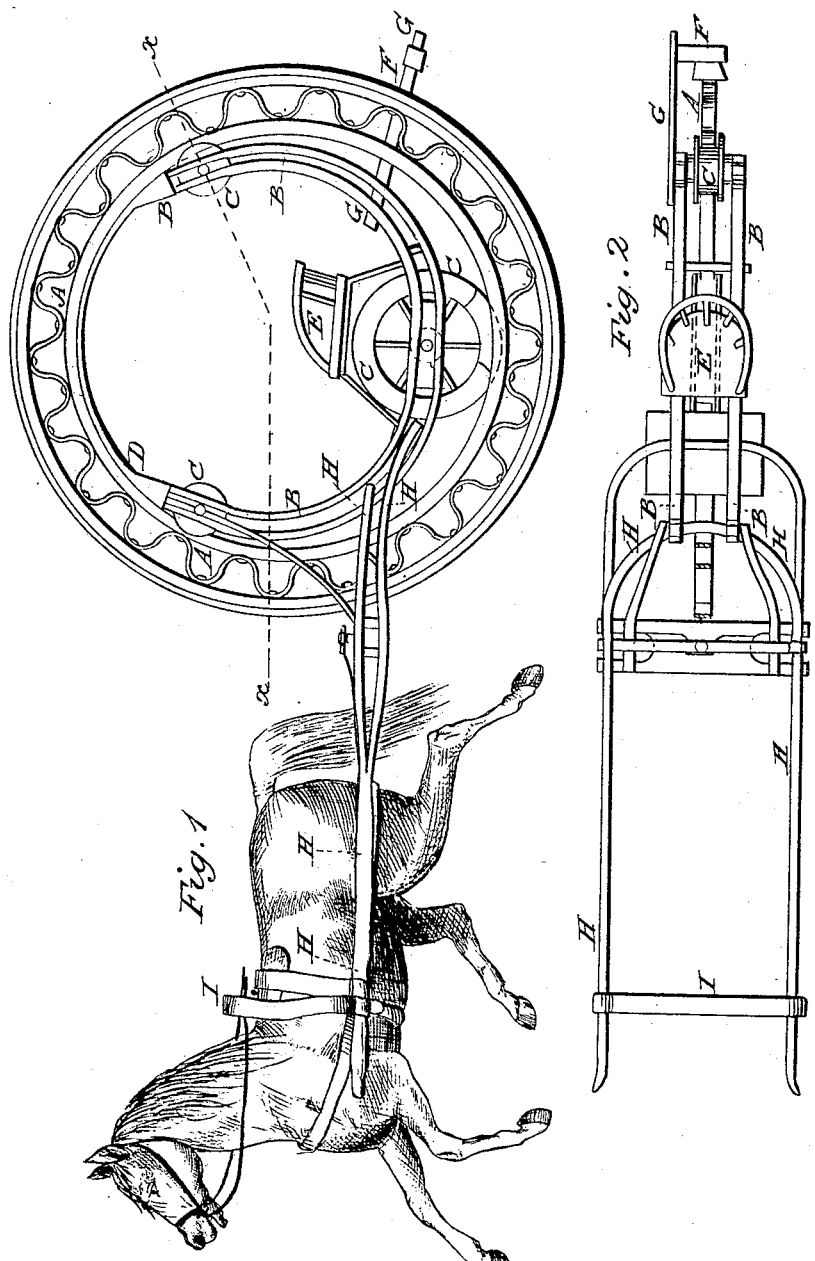

JAMES A. SINCLAIR, OF WOODSFIELD, OHIO, ASSIGNOR TO HIMSELF AND CHARLES MESSERLY.

Letters Patent No. 99,114, dated January 25, 1870.

IMPROVED ONE-WHEELED SULKY.

The Schedule referred to in these Letters Patent and making part of the same.

*To all whom it may concern:*

Be it known that I, JAMES A. SINCLAIR, of Woodsfield, in the county of Monroe, and State of Ohio, have invented a new and useful Improvement in One-Wheel Sulky; and I do hereby declare that the following is a full, clear, and exact description thereof, which will enable others skilled in the art to make and use the same, reference being had to the accompanying drawings, forming part of this specification, in which—

Figure 1 is a side view of my improved sulky.

Figure 2 is a top view of the same, partly in section, through the line $x\ x$, fig. 1.

Similar letters of reference indicate corresponding parts.

My invention has for its object to furnish a simple and convenient one-wheel sulky, which shall be so constructed and arranged as to enable the rider to go in his sulky wherever his horse can go; and It consists in the sulky constructed as hereinafter more fully described.

A is the wheel of the sulky, which is formed with an outer and inner rim, connected with each other by a continuous S or double V-shaped strip of wood or metal, interposed between them, and secured at its bends to the said rims alternately, with bolts or rivets. The outer rim of the wheel A has a tire placed upon its outer surface, and the inner rim of said wheel has a tire placed upon its inner surface.

B is the frame of the sulky, which is made double, as shown in fig. 1, to combine lightness and strength, which extends about two-thirds of the way around the interior of the inner rim, and which rides upon said inner rim, being connected therewith by three or more double-flanged wheels, C, which are pivoted to the said frame B, and upon which the wheel A rolls around.

The upper ends of the frame B are connected by a canopy, D, which should be made wide enough to protect the rider from the dripping of any mud or water that may be carried up by the revolution of the wheel A.

E is the driver's seat, which is attached to the middle or lower part of the frame B.

F is a brush, which is attached to an arm G, attached to the frame B, in such a position as to brush off the mud that may adhere to the wheel A, as it rises from the ground.

H are the thills or shafts, the rear ends of which are bowed, to pass around the wheel A, and are securely and rigidly attached to the forward lower part of the frame B.

I is a spring-bow, made of steel or other suitable material, covered with leather, attached to the forward parts of the thills H, and extending over the horse, to prevent the said thills H from springing too much.

J are the thill-sockets, which are connected both with the back-strap and belly-band, to prevent the up-and-down movement of the thills, so as to enable the horse to control the sulky, and keep it in a vertical position.

Having thus described my invention,

I claim as new, and desire to secure by Letters Patent—

An improved one-wheel sulky, formed by the combination of the wheel A, frame B, wheels C, with or without canopy D, seat E, thills H, and spring-bow I, with each other, substantially as herein shown and described, and for the purpose set forth.

JAS. A. SINCLAIR.

Witnesses:
C. M. MESSERLY,
W. T. SINCLAIR.